Feb. 6, 1951     J. J. OSPLACK     2,540,961
PIVOT ARM GEAR ROLLING FIXTURE

Filed July 8, 1946     3 Sheets-Sheet 1

INVENTOR
Joseph J. Osplack
BY
HIS ATTORNEYS

Feb. 6, 1951          J. J. OSPLACK          2,540,961
PIVOT ARM GEAR ROLLING FIXTURE
Filed July 8, 1946                    3 Sheets-Sheet 2
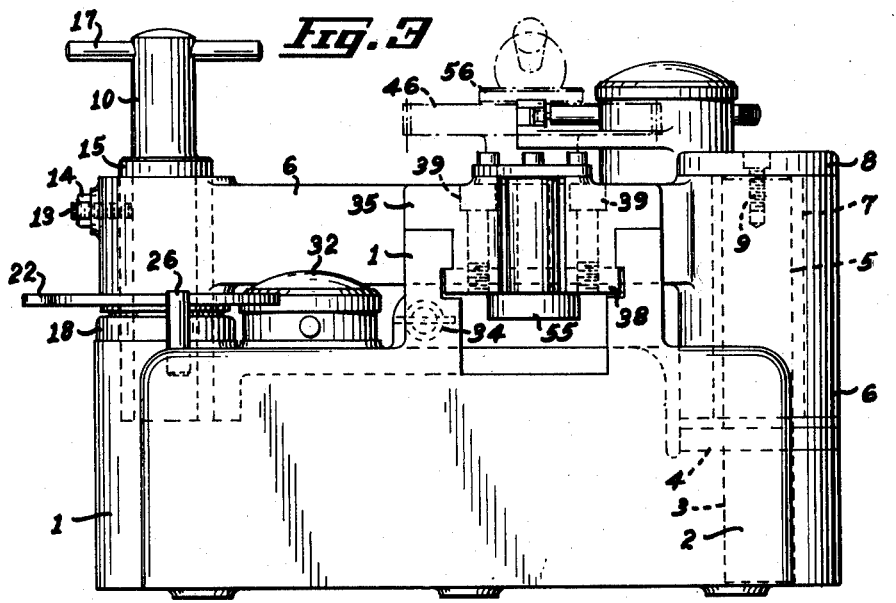
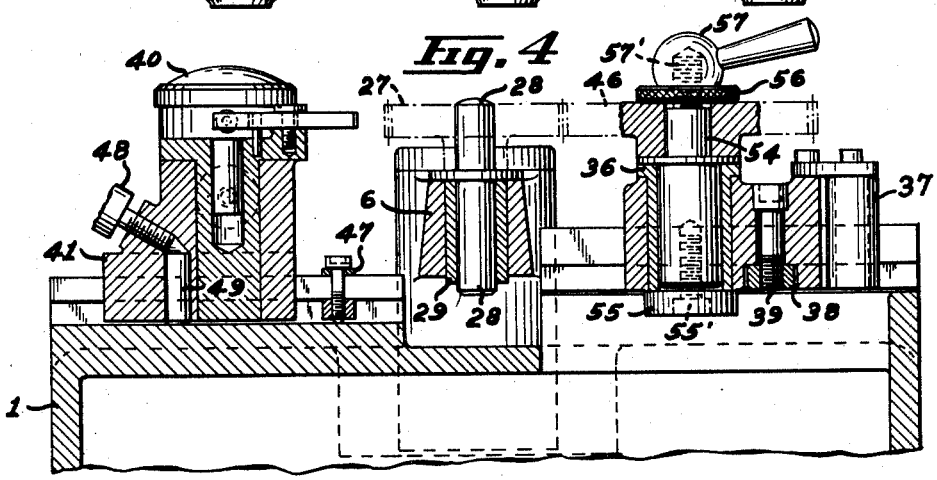
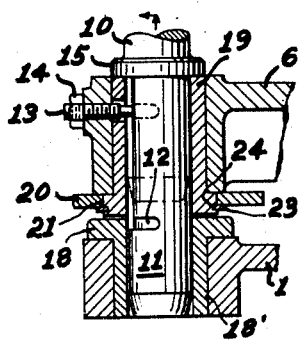
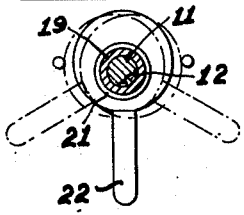
INVENTOR
Joseph J. Osplack
BY
Pennie, Edmonds, Morton & Barrows
HIS ATTORNEYS Feb. 6, 1951 J. J. OSPLACK 2,540,961
PIVOT ARM GEAR ROLLING FIXTURE
Filed July 8, 1946 3 Sheets-Sheet 3

INVENTOR
Joseph J. Osplack
BY
Pennie, Edmonds, Morton & Barrows
HIS ATTORNEYS

Patented Feb. 6, 1951

2,540,961

UNITED STATES PATENT OFFICE 2,540,961

PIVOT ARM GEAR ROLLING FIXTURE

Joseph J. Osplack, Detroit, Mich., assignor to Vinco Corporation, Detroit, Mich.

Application July 8, 1946, Serial No. 681,932

9 Claims. (Cl. 33—179.5)

This invention relates to gear rolling inspection fixtures and in particular to such fixtures for the inspection of production gears by use of a master spur gear running with them.

The inspection of the "run-out" of gears by rolling a pair of them closely-meshed together and measuring the amount of relative movement between their centers produced by such rolling is already old. The measurement of "backlash" between gears by fixing one of a mated pair against rotation, meshing the other with it with pitch circles tangent, and then measuring the amount of rotation remaining possible in the unfixed one is also old.

Apparatus for carrying out such methods of gear inspection in the past has comprised a fixed carriage and a movable carriage, each carrying one of the pair of mated gears. The movable carriage was urged towards the fixed carriage by resilient means and was guided in its movement by track means. The two mating gears were rotated and the movement of the movable carriage in either direction along the track means was measured to determine "run-out." The gear on the fixed carriage was then locked against rotation and the movable carriage was locked on the track means with the centers of the two gears separated by the sum of their pitch radii. The amount of free movement remaining possible to a tooth of the rotatable gear on the movable carriage at its pitch circumference was then measured to determine "backlash." Such apparatus is but poorly suited for carrying out the method attempted because inherent inaccuracies in it gravely affect the reliability of the results, especially in that measurable movements of the carriage will not accurately reflect the "run-out" because of inevitable inaccuracies in the adjustment of the carriage to the track means.

It is the purpose of my invention to provide improved apparatus for carrying out the method I have just described and to avoid in my improved apparatus the difficulties I have mentioned as limitations on prior apparatus.

In addition to providing a degree of inherent accuracy impossible in gear rolling fixtures of the prior art, a gear rolling fixture constructed according to my invention will provide a fast and accurate check both of "run-out" and "backlash" on one fixture using a single master gear that is "rolled" with the production gears to be checked under conditions duplicating their final assembly conditions. Moreover, a gear rolling fixture of my invention will give direct readings, without further computation, of the exact departures from the standard of the gear being inspected.

Basically, the apparatus of my invention provides for comparing a production gear with a mating master gear by mounting one gear rigidly against all movement except the ability to rotate, and mounting the other gear on an arm which permits the center of the gear mounted on it to move toward and away from the center of the mating gear, the two gears being held in contact by spring means so that any irregularity of the production gear is capable of direct measurement by dial indicator held against the arm. Measurement of "backlash" is then obtained by locking the arm at the proper gear center distance and holding one of the gears against rotation while measuring the amount of free rotation permitted to the other gear by the clearance present.

Since all movement that would be imparted to the centers of the gears by reason of "run-out" is imparted to the dial indicator without binding or play, except for the almost undetectable play between pivoted members constructed according to modern machining methods, as opposed to the relatively large play inevitable in track mechanisms, the inherent accuracy of such a pivot arm fixture is very great.

For a complete understanding of my invention, including several embodiments thereof, reference is made to the accompanying drawings in which:

Fig. 3 is an end elevation of the fixture shown in Fig. 1;

Fig. 4 is a section taken on the line 4—4 of Fig. 1;

Fig. 5 is a detail section taken on the line 5—5 of Fig. 1;

Fig. 6 is a horizontal section taken on the line 6—6 of Fig. 2;

Figure 1:
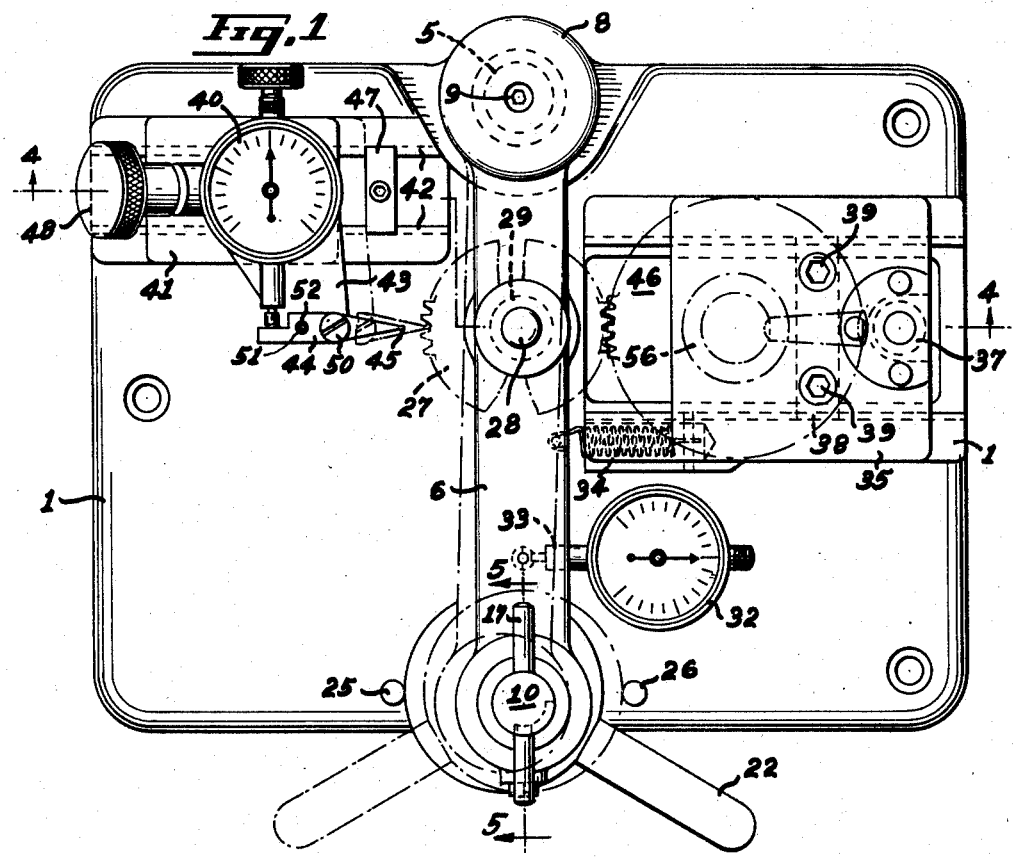
Fig. 1 is a plan view of a spur gear rolling fixture constructed according to my invention.
Figure 2:
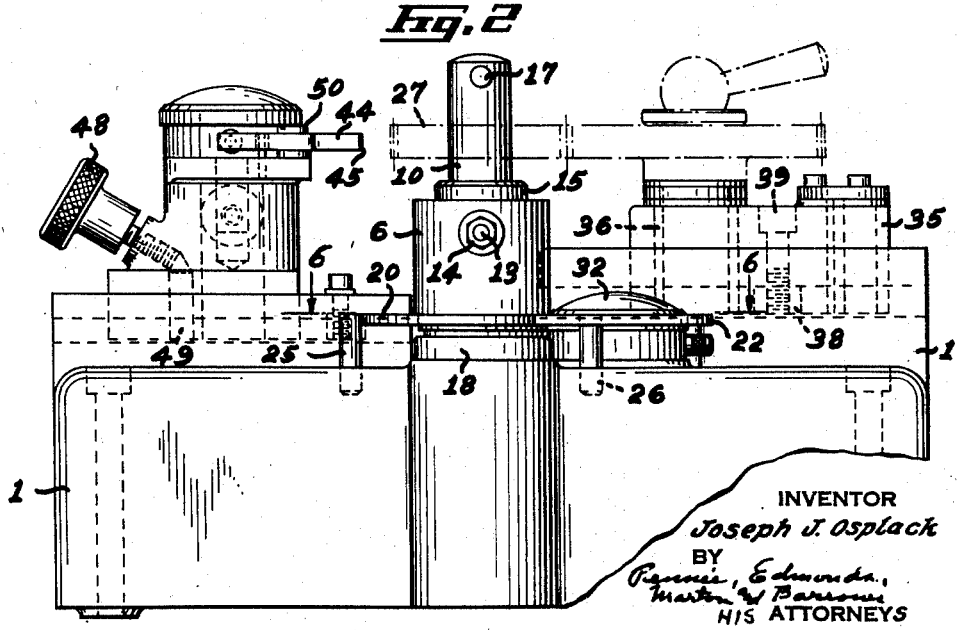
Fig. 2 is a side elevation of the fixture shown in Fig. 1.

Referring now to Figs. 1 through 6, a pivot arm 6 is pivoted on a base 1 about a pivot pin 5. Pivot pin 5 is attached to base 1 as an extension of stud 2 above flange 4 the lower part of which is press fitted into hole 3. Hardened bushing 7 is inserted in the hub of pivot arm 6 to protect it from wear. Cover flange 8 is fastened to pivot pin 5 by screw 9 to secure pivot arm 6 thereon against vertical movement.

Pivot arm 6 is permitted only limited rotation about the axis of its attachment to pin 5, this rotation being controlled by limit pins 25 and 26 protruding from base 1 adjacent the free end of pivot arm 6. Moreover, this limited rotation can be entirely prevented by lock bolt 10 being depressed and engaged in the bore of hardened bushing 18 which is fitted in hole 18' in base 1.

Bolt 10 comprises a shank 11 having a bayonet type slot 12 thereon held in alignment by a dog point screw 13 and lock nut 14 in the free end of pivot arm 6. As will appear more completely later, when the fixture is being used to measure the "run-out" of a gear being inspected, shank 11 of lock bolt 10 is entirely withdrawn from bushing 18 and base 1 and held in this withdrawn position by the engagement of screw 13 in bayonet slot 12. Handle 17 is provided on lock bolt 10 to facilitate the withdrawal and turning thereof while collar 15 prevents lock bolt 10 from entering more deeply than desired into bushing 18. In order to protect the free end of arm 6 against wear, lock bolt 10 is carried therein by a hardened bushing 19.

A cam mechanism is provided about bushing 19 for varying the effect of stop pins 25 and 26 and limiting the movement of the free end of pivot arm 6. This mechanism comprises a disc 20 having a hole 21 through it eccentric with, and a handle 22 extending from, its outside diameter. The inside surface of hole 21 in disc 20 engages snugly but slidably, the outside surface of the portion of bushing 19 emerging below arm 6. Disc and handle are held in place by snap retainer ring 23 located in groove 24 on bushing 19 below disc 20.

Intermediate the axis about which pivot arm 6 is pivoted and its free end, but rather nearer to pivot pin 5, is located shoulder stud 28 for carrying master gear 27 rotatable thereon. Shoulder stud 28 is carried in arm 6 by bushing 29.

The "run-out" dial indicator 32 is attached to base 1 having its indicator spindle 33 perpendicular to and in contact with arm 6 at a spot the distance of which from the axis of pivot of arm 6 is exactly twice that of the axis of master gear 27.

Attached to pivot arm 6 at one end and to base 1 at the other is a tension spring 34 arranged to urge pivot arm 6 about the axis of pivot pin 5 against the indicator spindle 33.

Production gear spindle bracket 35 is slidably mounted on base 1 and is secured against movement in its track by means of clamp 38, clamping pressure being obtained by screws 39. Sliding spindle bracket 35 is provided with two bushings 36 and 37 to accommodate spindles of production gears of different sizes. By means of adjustment or reversal of spindle bracket 35 on base 1 and by choice between spindle bushings 36 and 37, a wide range of diameters of production gears can be accommodated on the same fixture.

Backlash dial indicator 40 is mounted on slidable holder 41 in guides 42, which are machined integral with base 1. Integral with holder 41 is an extension 43 having provision for screw 50 on which finger 44 is pivoted within limits permitted by undersize pin 51 inserted in extension 43 and oversize hole 52 provided in finger 44. The point 45 of finger 44 is advanced into a tooth space of master gear 27 to a point near the pitch circle of the gear during the test for "backlash."

The production gear to be checked 46 is carried on sliding spindle bracket 35 by spindle 54 which passes through bushing 36. A lower cap 55 secured to spindle 54 by screw 55' bears circumferentially on bushing 36 at the bottom and locks the spindle against rotation in the bushing by the clamping action of a flange on the spindle against the top of the bushing. Gear 46 may be locked against turning about spindle 54 by the action of knurled washer 56 pressing it against the integral spindle flange when hand nut 57 threaded onto clamp screw 57' on spindle 54 is tightened.

In order to set up the gear rolling fixture illustrated in Figs. 1-6, for testing a run of production gears of a particular size, a master gear, machined to the closest possible tolerances and usually duplicating the mating gear that will run with the assembled production gear, is selected. A pitch disc of the exact pitch diameter of the master gear is placed on shoulder stud 28, and a pitch disc of the exact pitch diameter of the production gear to be tested is placed on spindle 54. Pivot arm 6 is locked against rotation about the axis of pivot pin 5 by lock bolt 10. The location of sliding spindle bracket 35 is then set and locked with the circumferences of the two pitch discs in contact.

Master gear 27 is then installed on shoulder stud 28, lock bolt 10 is withdrawn and held in its withdrawn position by bayonet slot 12, and pivot arm 6 is rotated about pivot pin 5 the maximum distance away from dial indicator 32 by means of the camming action of disc 20 on stop pin 26. A production gear 46 is installed on spindle 54, but not locked against rotation. By reverse action of disc 20, spring 34 is permitted to bring master gear 27 and production gear 46 into mesh under constant spring load.

The gears are then rolled by hand and any "run-out" or irregularity of production gear 46 such as eccentricity, spacing error, form (tooth profile), parallelism of teeth, pressure angle, etc. can be read directly on dial indicator 32. It will, of course, be understood that, since movement of the point of contact of indicator spindle 33 with pivot arm 6 is twice that of the center of shoulder stud 28, dial indicator 32 must be specially calibrated to give a direct reading.

In order to test "backlash," pivot arm 6 is locked in position by lock bolt 10 and slidable holder 41 is moved forward in guides 42 so that the point 45 of indicator finger 44 intersects the pitch circle of master gear 27. Stop block 47 is then locked in position on slides 42 so that the forward travel of slidable holder 41 is limited by that position. Slidable holder 41 is locked against stop block 47 by means of the clamping action of thumb screw 48 and pin 49. Production gear 46 is turned clockwise until the tooth flank of master gear 27 is in contact with the point 45 of finger 44 and the dial indicator reads "zero." Production gear 46 is now locked against rotation by clamping action of hand nut 57 and the amount of free motion permitted master gear 27 is read directly on indicator dial 60.

By loosening sliding block 41 through thumb screw 48 and sliding the point 45 out of interference with the teeth of gear 27, this "backlash" measurement may be repeated for as many teeth of a production gear as desired. The provision of stop block 47 facilitates the rapid repetition of a number of "backlash" readings.

Figure 7:
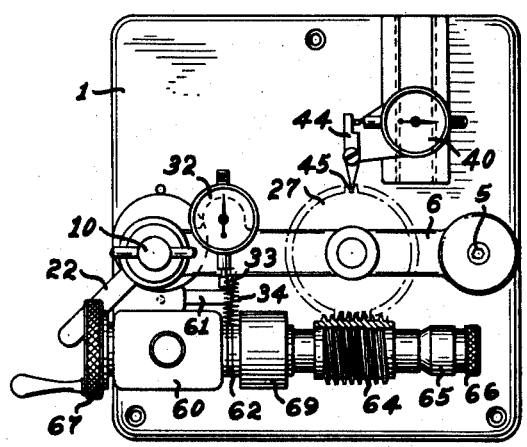
Fig. 7 is a plan view of a gear rolling fixture constructed according to my invention adapted to inspect a worm gear.

Referring now to Fig. 7, a modified form of the gear rolling fixture previously described is illustrated in which, as before, the base 1 carries a pivot arm 6 pivoted about the axis of a pivot pin 5 and locked on its free end by means of a lock bolt 10. The limited travel of the free end of arm 6 is controlled by cam mechanism 22. Base 1 also carries dial indicator 40 slidably mounted, as already described, for measuring "backlash" by insertion of the point 45 of a finger 44 between the teeth of a gear carried on pivot arm 6.

A bracket 60 is added to base 1, carrying the worm shaft 62 passing through it with a small hand wheel 67 on one end thereof. The free end of shaft 62 is adapted to pass through the worm 64 to be tested. A taper center collar 65 slides on shaft 62 and through the influence of knurled nut 66 screwed on to the end of that shaft forces worm 64 into tight engagement with the base of chuck 69.

A dial indicator 32 for measuring "run-out" is mounted on pivot arm 6 with its indicator spindle 33 in contact with an anvil on base 1 during the "run-out" test.

Spring 34, as before, urges arm 6 about pin 5 in the direction to press indicator spindle 33 into engagement with anvil 61. The method of testing "backlash" and "run-out" is, of course, the same with this fixture as with the fixture already described, hand wheel 67 being provided to facilitate rotation of worm 64.

Figure 8:
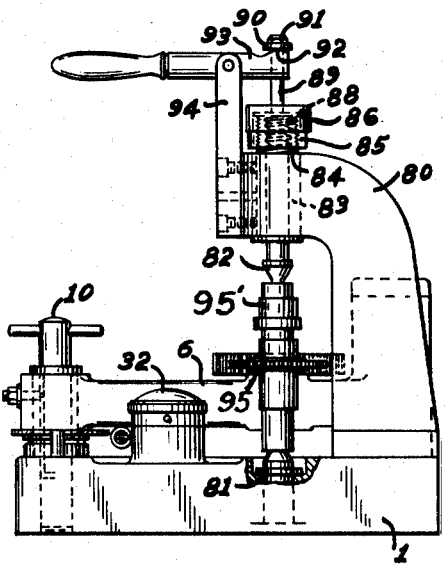
Fig. 8 is an elevation of a gear rolling fixture constructed according to my invention adapted to inspect a gear having integral shafts.

Referring now to Fig. 8, an embodiment of my invention is shown adapted to test a production spur gear mounted on an integral shaft. In this embodiment, the arrangement of arm 6, lock pin 10, dial indicator 32 and "backlash" indicator means (not visible in Fig. 8) is the same as described in connection with Figs. 1 through 6.

Bracket 80 is provided, firmly attached to base 1, for carrying the production gear 95 to be tested with integral shaft 95'. Base 1 carries a lower center plug 81 and bracket 80 carries an upper center 82 exactly aligned with center 81. Centers 81 and 82 engage the centers of the opposite ends of shaft 95'. Bushing 83 in bracket 80 projects therefrom with an externally threaded portion 85.

The shank of center 82 is journalled in bushing 83 and extends into its threaded portion 85, but with a reduced diameter, thus forming a shoulder at 84 which engages compression spring 88 inside threaded portion 85. A further reduced portion 89 of the shank of center 82 passes through a hole in cap 86 which is screwed down over portion 85 and retains spring 88. The upper end of reduced portion 89 is threaded and carries a knurled nut 90 locked by lock nut 91 thereon. The lower surface of the knurled nut 90 rests on arcuate surfaces 92 of a bifurcated lever 93 which is pivotally supported by bracket 94 affixed to bracket 80.

In order to load the fixture with a production gear 95 with integral shaft 95', the operator depresses the outer end of lever 93, thus raising upper center 82. The lower end of shaft 95' is then placed on lower center 81 and upper center 82 is forced into contact with the upper end of shaft 95' by the action of spring 88 when lever 93 is released. The locking and unlocking of production gear 95 against rotation for testing "backlash" is accomplished by adjusting the force of spring 88 by means of threaded cap 86.

Figure 9:
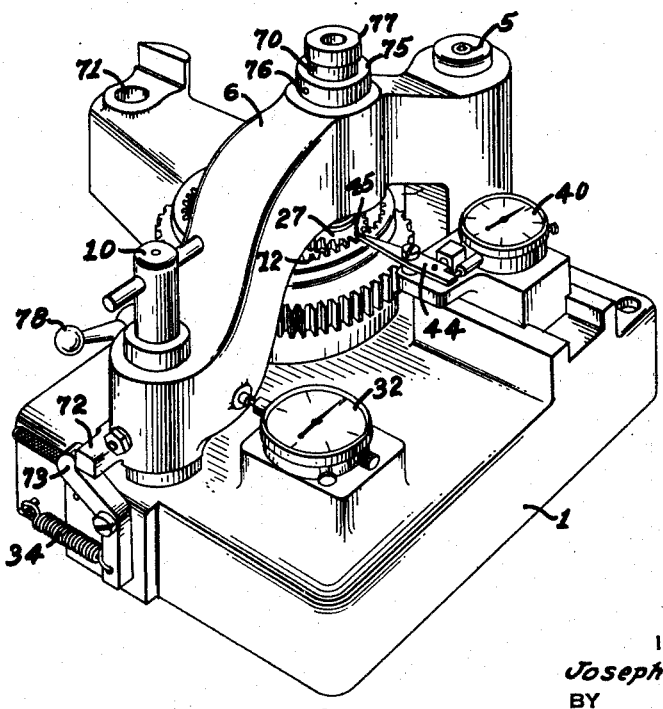
Fig. 9 is a perspective view of a gear rolling fixture constructed according to my invention adapted to inspect an internal gear.

Referring now to Fig. 9, a modified form of the fixture of my invention is shown adapted to test production internal gears. In this case a special bridge type of pivoted arm 6 is employed, rotatable, as before, about a pivot pin 5 carried in base 1 and having at its free end lock bolt 10. Dial indicators 32 and 40, are used to check "run-out" and "backlash" respectively, as before.

A master spur gear 27 is affixed on pivot arm 6 in this case below, instead of above, the arm to test internal gear 72 and, it will be observed, that in order to facilitate the testing of "backlash," spur gear 27 is made wider to set higher than internal gear 72, thus providing access to the spaces between the teeth of spur gear 27 above the teeth of internal gear 72 for point 45 of finger 44, which actuates indicator 40.

To load and unload a fixture constructed as illustrated in Fig. 9, it is necessary that arm 6 be swung completely away from the work. Hence, an additional bushing 71 is provided in base 1 so that lock bolt 10 can be used to anchor arm 6 in a fully retracted position.

Moreover, a rearranged spring means must be provided for urging arm 6 into operative contact with indicator means 32. This comprises a spring 34 carried now on the side of base 1 and applying pressure to the free end of arm 6 at 72 through means of bellcrank 73. By this means, arm 6 may be readily engaged and disengaged from the influence of spring 34.

Likewise, means must be provided for retracting master gear 27 from engagement with internal gears 72 and, on that account, spindle 70 carrying master gear 27 is provided with a knob 77 and an internal bayonet groove on spindle 70 similar to that already described in connection with lock bolt 10, engaging dog head screw 76 which passes through the walls of bushing 75. Ball handle 78 operates clamping means within base 1 for locking the rotatable mounting to which internal gear 72 is fixed against rotation during the "backlash" test.

While I have described my invention in terms of details of particular fixtures, it is not my intention to be limited by those details but rather by the scope of the appended claims.

I claim:

1. A gear rolling fixture comprising a base, an arched arm pivotally carried by said base, a spindle journaled in said arm substantially at the peak of the arch therein, means for mounting a master gear on said spindle within said arch below the peak thereof, means for retracting said spindle to move a gear thereon toward said peak, means for mounting an internal gear to be tested rotatably on said base, spring means urging said arm in a direction to bring a master gear thereon into engagement with a gear to be tested on said base when said spindle is unretracted, and indicator means for precisely measuring the movement of said arm about its pivot when the distance between the axes of a master gear thereon and of a gear to be tested mounted on said base is roughly equal to the algebraic sum of the pitch radii of both gears.

2. A gear rolling fixture according to claim 1 in which the spindle when unretracted is arranged to hold a portion of the width of the teeth of a master gear thereon protruding from engagement with the teeth of a gear to be tested mounted on the base, including a mounting block slidably carried on said base, a second indicator means on said block, a pivoted finger mounted on said block with one end in operative contact with said second indicator means, means for locking said block in position, means for securing the gear to be tested against rotation, means for locking the arm against movement, said means for locking said block in position being so spaced in relation to the center of the master gear that the other end of said finger can be set to intersect the pitch circle thereof in the protruding portion of its teeth.

3. A gear rolling fixture comprising a base, an arm pivoted near one end thereof on said base, means for mounting one of a pair of mating gears consisting of one gear to be tested and one master gear rotatably on said arm, means for mounting the other of said gears rotatably on said base, spring means urging said arm in a direction to bring a gear thereon into engagement with a gear on said base, indicator means for precisely measuring the movement of said arm about its pivot when the distance between the axes of a gear thereon and of a gear on said base is roughly equal to the sum of the pitch radii of said gears, means for securing one of said gears against rotation, means for securing the free end of said arm to said base in a position in which the distance between the axes of a gear thereon and of a gear on said base is precisely equal to the sum of the pitch radii on said gears, and means for measuring the residual travel permitted one of said gears when the other is secured against rotation.

4. A gear rolling fixture according to claim 3 in which the means for securing the free end of the arm include a lock bolt carried by the arm near the free end thereof slidable therein toward and away from the base, an orifice in said base receiving said lock bolt when said arm is in the desired position, and means carried by said arm for securing said lock bolt out of contact with said base.

5. A gear rolling fixture according to claim 3 including a pair of stop pins in the base spaced apart on opposite sides of and at a distance from the pivot of the arm, and eccentric cam means carried by said arm intermediate said stop pins, the degree of eccentricity of said cam means being sufficient to cam said arm by reaction against one of said stop means against the resistance of the spring means a sufficient distance from a position in which the gears are completely in mesh under spring urging to a position in which said gears are disengaged.

6. A gear rolling fixture according to claim 3 including an anvil fixed on the base in which the indicator means is mounted on the arm in operative contact with said anvil.

7. A gear rolling fixture according to claim 3 in which the means for mounting a gear on the base include a spindle holder slidably carried on said base, a spindle carried by said holder for mounting a gear to be tested, and adjustable means for locking said slide in position on said base.

8. A gear rolling fixture according to claim 7 in which the holder is provided with a plurality of spindle mountings.

9. A gear rolling fixture according to claim 3 in which the means for mounting a gear on the base include a center stud in said base, a bracket on said base overhanging said stud, a retractable center journaled in said bracket in line with said stud, a shank on said center protruding through said bracket, adjustably resilient means urging said center toward said stud and retracting means for moving said center away from said stud.

JOSEPH J. OSPLACK.

REFERENCES CITED

The following references are of record in the file of this patent:

UNITED STATES PATENTS

| Number | Name | Date |
|---|---|---|
| 1,222,392 | Green et al. | Apr. 10, 1917 |
| 1,233,014 | Barker | July 10, 1917 |
| 1,445,631 | Lotz | Feb. 20, 1923 |
| 1,554,646 | Olson | Sept. 22, 1925 |
| 2,336,747 | Palquist | Dec. 14, 1943 |
| 2,340,978 | Orcutt | Feb. 8, 1944 |
| 2,348,712 | Dahlerup | May 16, 1944 |
| 2,381,975 | Ernst | Aug. 14, 1945 |
| 2,399,012 | Farrance | Apr. 23, 1946 |

FOREIGN PATENTS

| Number | Country | Date |
|---|---|---|
| 590,607 | Germany | Jan. 5, 1934 |
| 608,163 | Germany | Jan. 18, 1935 |

OTHER REFERENCES

"Gages, Gaging & Inspection, Hamilton," The Industrial Press, N. Y., 1918, page 266.

Machinery, July 1925, page 888.